United States Patent [19]

Jeannotte et al.

[11] Patent Number: 5,027,906
[45] Date of Patent: Jul. 2, 1991

[54] ROCK PICKER ADAPTION TO FRONT END LOADER

[76] Inventors: Gerald Jeannotte; Jean J. Jeannotte, both of Coderre, Saskatchewan, Canada, S0H 0X0

[21] Appl. No.: 535,065

[22] Filed: Jun. 8, 1990

[30] Foreign Application Priority Data

Sep. 28, 1989 [CA] Canada .................................. 614006

[51] Int. Cl.$^5$ ............................................... E02F 3/00
[52] U.S. Cl. ..................................... 171/86; 171/105; 37/DIG. 12
[58] Field of Search ..................... 171/84, 86, 99, 104, 171/105, 107; 37/117.5, 120, 2 R, 118 R, DIG. 12, DIG. 3, 80 A

[56] References Cited

U.S. PATENT DOCUMENTS

| | | | |
|---|---|---|---|
| 2,491,079 | 12/1949 | Bestland | 171/86 X |
| 2,635,884 | 4/1953 | Christiansen | 37/117.5 X |
| 2,636,328 | 4/1953 | Jochim | 171/86 X |
| 2,763,975 | 9/1956 | Weigel | 171/86 X |
| 2,863,233 | 12/1958 | Johnson | 37/117.5 |
| 2,980,189 | 4/1961 | Jacobs | 37/2 R X |
| 3,356,158 | 12/1967 | Deaver et al. | |
| 3,653,524 | 4/1972 | Rich et al. | 37/117.5 X |
| 4,466,491 | 8/1984 | Tower | 37/2 R X |
| 4,581,833 | 4/1986 | Zeravica | 37/117.5 X |

FOREIGN PATENT DOCUMENTS

688150 9/1979 U.S.S.R. ................................ 37/2 R

*Primary Examiner*—Dennis L. Taylor
*Assistant Examiner*—Jeffrey L. Thompson
*Attorney, Agent, or Firm*—Jones, Tullar & Cooper

[57] ABSTRACT

A hydraulic stone picker adapted for use in conjunction with a modified front-end loader. The fork is pivotally mounted to the side of the front-end loader which has been modified by addition thereto of a front and extended side walls to define a collecting bin. Stones dislodged by the fork are transferred to the collecting bin by actuation of a hydraulic ram which rotates the fork from a lowered to a raised position. The apparatus is provided with support members to prevent damage to the fork during use. The linkage of the fork to the hydraulic ram includes a lost-motion connection which permits the fork to pivot during use to accommodate surface irregularities.

4 Claims, 3 Drawing Sheets

ROCK PICKER ADAPTION TO FRONT END LOADER

BACKGROUND OF INVENTION

The invention relates to an apparatus to facilitate removal of stones from a field. In particular, the invention relates to a stone picker adapted for attachment to the side of a modified front-end loader.

To prepare land for agricultural purposes, it is often necessary to remove stones therefrom to allow uniform cultivation of the land. Accordingly, several inventions are known for adapting a tractor or like vehicle for use as a stone picker. A common embodiment of a stone picker for use with a tractor involves substitution of the front-end loader with a tined implement or fork for dislodging stones. In such a design, however, the front end of the tractor obstructs the operator's visibility which renders the operation more difficult. An additional limitation of such a design is that the fork must be emptied after dislodgement of only a few stones.

Another typical design for a stone picker is disclosed in U.S. Pat. No. 3,356,158. This patent discloses an apparatus with a pivoting fork and a stone collecting bin which may be drawn behind a tractor. Designs of this nature lack the manoeuvrability of adaptions to the front-end loader. The efficiency of operation is further reduced since the operator must divide his attention between the trailing rock picker and the forward movement of the towing vehicle.

Jacobs, in U.S. Pat. No. 2,980,189, discloses a rock picker for mounting to the side of a tractor with a rear mounted stone collecting bin. This invention, however, cannot provide the manoeuvrability of the adapted front-end loader design described above. Furthermore, the front wheels of the tractor, being aligned with the stone picker, will hamper operation of the invention by rolling over and further embedding the stones to be removed.

The subject invention overcomes the deficiencies of the prior art by providing a stone picker adapted for attachment to the side end of a modified front-end loader. This allows for enhanced manoeuvrability without obstruction of the operator's visibility. To further improve the efficiency of the invention, the front-end loader is modified to resemble a collecting bin by attachment thereto of front and side plates.

SUMMARY OF INVENTION

The invention therefore provides a fork member mounted to a front-end loader bucket provided with a front plate, side plates and a support platform extending to one side of the modified bucket. The fork is pivotally mounted to the side plate of the modified bucket above the support member with the axis of rotation being essentially horizontal and parallel to the side plate. A hydraulic drive is coupled to the support platform and the fork member, which, when actuated, displaces the fork member to transfer stones into the bucket.

BRIEF DESCRIPTION OF DRAWINGS

The invention will now be discussed in greater detail with reference to the following drawings in which.

DETAILED DESCRIPTION OF INVENTION

Figure 1:
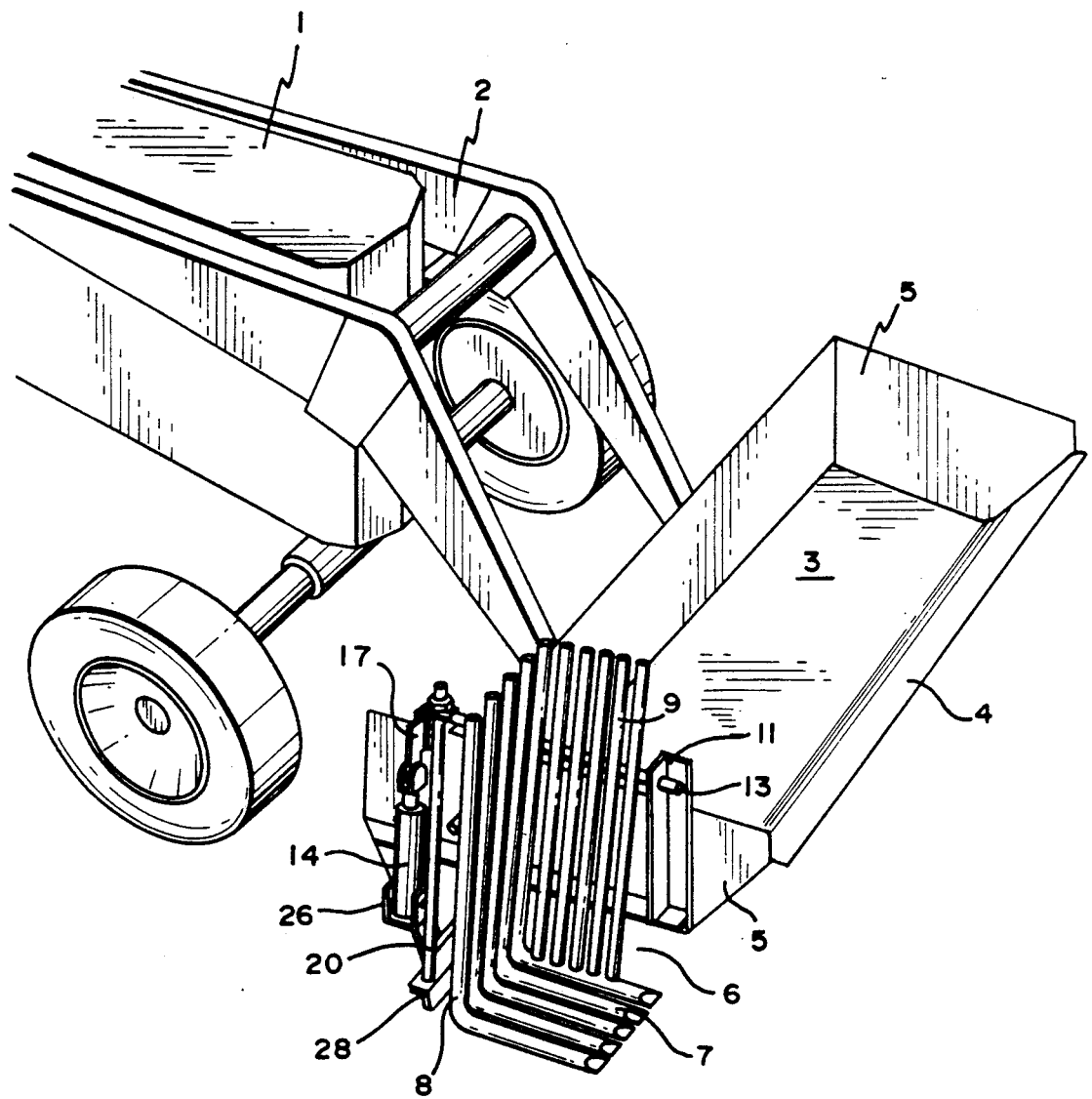
FIG. 1 shows a perspective view of the fork member mounted to the modified front-end loader bucket.

A perspective view of the apparatus of the invention is shown in FIG. 1. The front-end loader bucket, generally designated 3, mounted to the power arms 2 of a typical tractor 1 is modified by attachment thereto of a front plate 4 and side plates 5 to provide a bin for collecting stones.

Two vertical support angles 11 are welded to the outward side of one of the side plates and extend vertically upwardly above the upper edge of the side plate. The support angles 11 house coaxial circular seal flangette bearings 12 at a position above the upper edge of the side plate 5. The bearings support a cylindrical shaft 13 to which the fork, generally designated 6, is attached.

A fork supporting member 23 extends horizontally outward from the lower region of the side plate 5. In the preferred embodiment, this supporting member is triangular having a first fork supporting arm 29, normal to the side plate 5 and extending horizontally outward therefrom and a second arm 30 extending from the outward end of said first arm to the side plate at a position rearward of the base of the first arm to provide additional bracing thereto. In its lowered position, the fork 6 will rest against this supporting member which will also serve to brace the fork during dislodgement of stones.

The fork 6 is comprised of tines arranged to define a generally horizontal bottom 7, a vertical back 8 and a generally vertical side 9. In the preferred embodiment, the tines are prepared from metal rods of one inch diameter and spaced approximately one and a half inches apart. The bottom 7 and vertical back 8 may be formed from L shaped rods. The tines forming the side 9 of the fork are welded at their lower end to the innermost tine of the bottom of the fork and towards their upper end to the cylindrical shaft 13. Together, the back and side of the fork define a chute along which stones may slide to fall into the collecting bin 3 when the fork is in its raised position. The leading edges of the tines forming the bottom of the fork are tapered to provide improved digging capability.

The rear side of the tines forming the back 8 of the fork 6 are welded near the lower ends thereof to an angled member 28 comprised of a generally horizontal and a generally vertical surface. The horizontal surface of this angled member 28 houses a stop assembly comprising a threaded aperture and a threaded stop pin 25. When the fork is in its lowered position, the stop pin 25 rests against the upper surface of the horizontal support member 23 and the generally vertical surface of said angled member 28 rests immediately forward of the forward vertical surface of the horizontal support member 23. The resting elevation of the fork may be adjusted by adjustment of the stop pin. During dislodgement of a stone, the forward vertical surface of the horizontal support member 23 engages the vertical surface of the angled support member 28 thereby bracing the fork 6. In its lowered position, the bottom of the fork will extend approximately six inches below the lower surface of the bucket 3. This allows the fork to pass along the ground surface while the bucket is slightly raised to avoid displacement of soil by the bucket.

Figure 2:
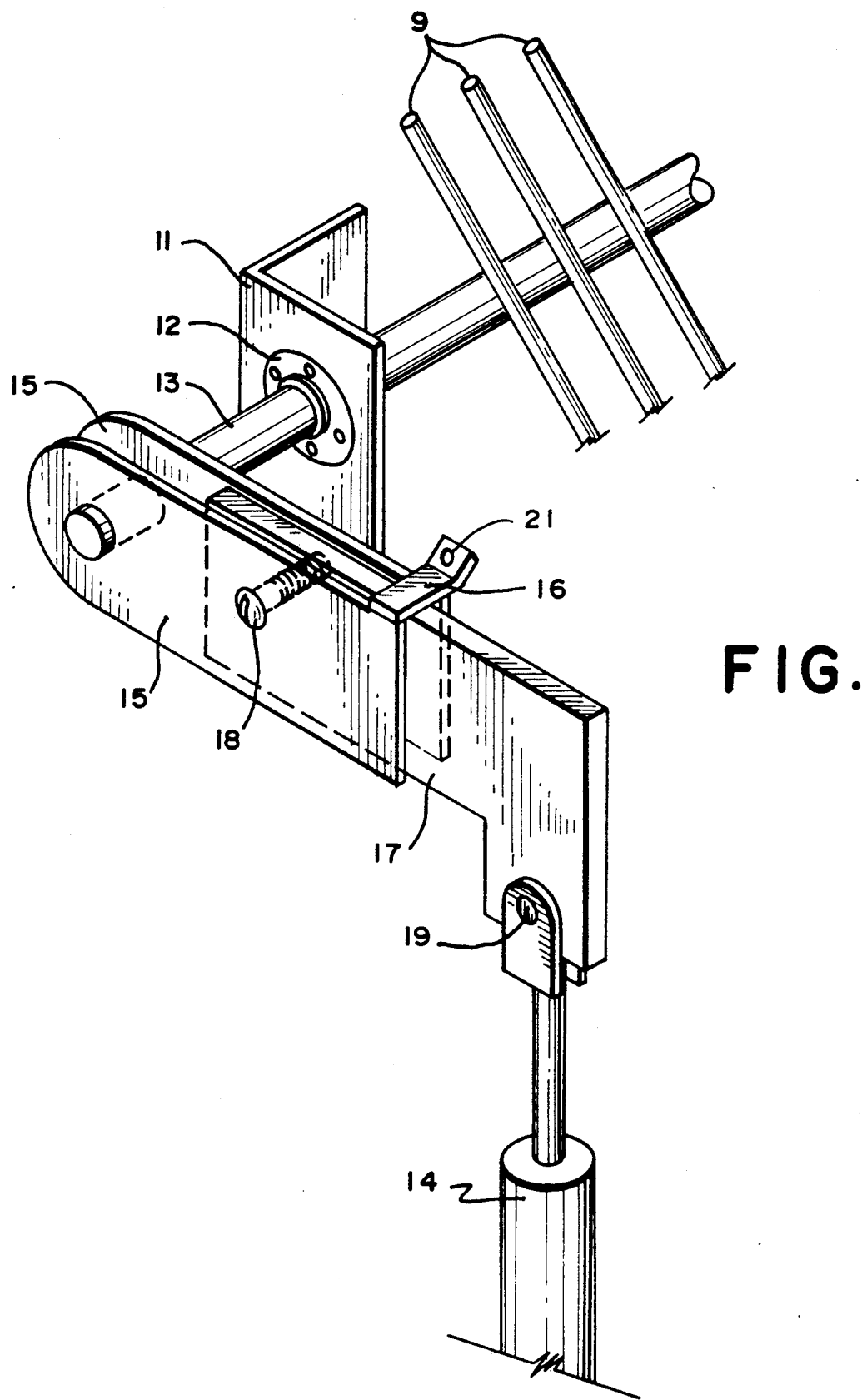
FIG. 2 shows a partial rear view of the invention showing the lost-motion coupling of the hydraulic arm to the fork shaft pivot arm.
Figure 3:
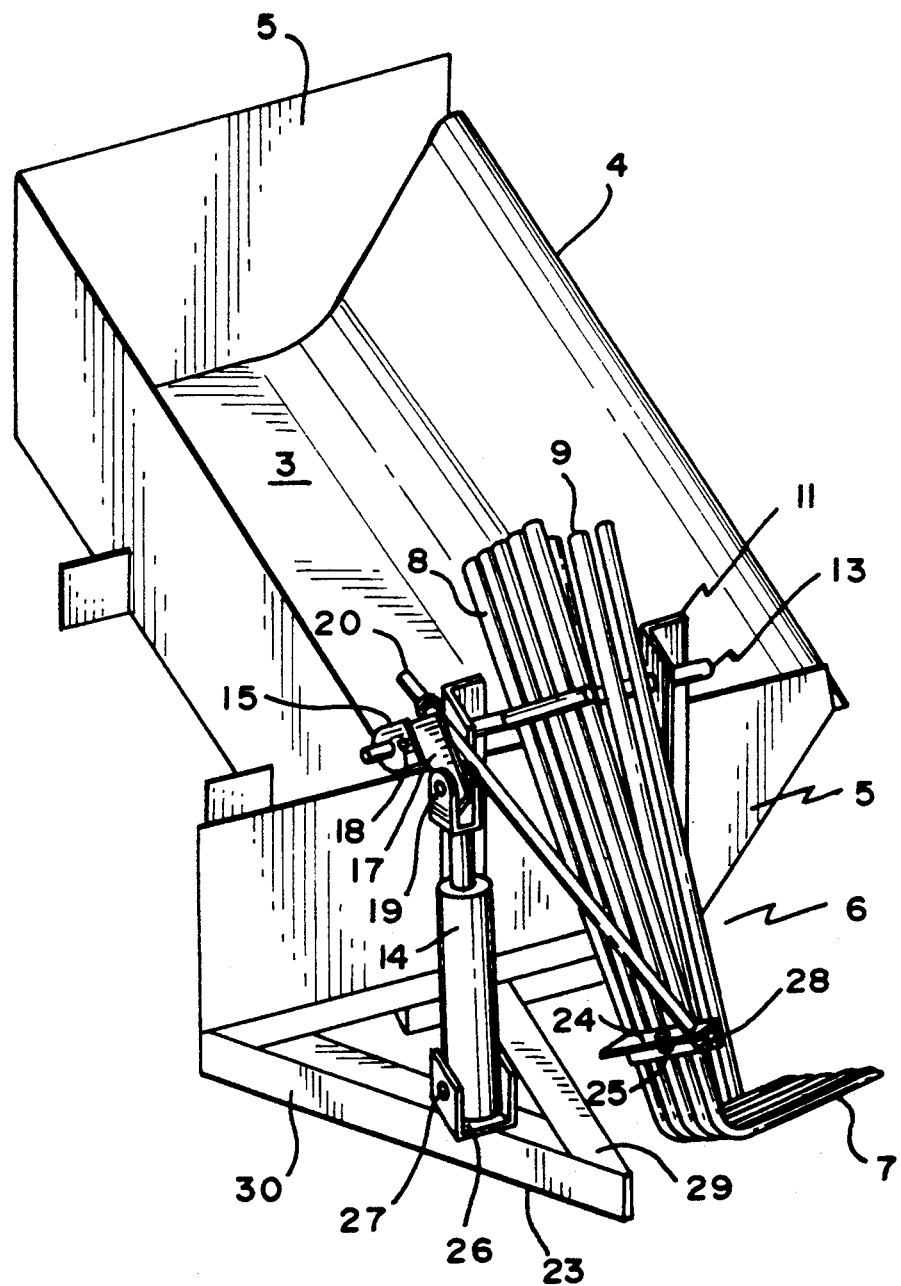
FIG. 3 shows a rear view perspective of the invention with the fork member slightly raised.

Rotation of the fork between its lowered and raised positions is performed by cooperation of a hydraulic power ram 14, mounted to the horizontal support member 23, with a lever arm 15, welded to the cylindrical shaft 13. The linkage, shown in FIG. 2, is a lost-motion connection which allows the fork member to pivot to accommodate uneven terrain. In the preferred embodiment, to provide the lost-motion linkage, the lever arm 15 is comprised of two opposing arms with a first pivot bolt 18 and a stop plate 16 passing therebetween as shown in FIG. 2. A pivot arm 17 is mounted to said first pivot bolt 18 and pivotally mounted by a second pivot bolt 19 to the upper end of the hydraulic ram 14. At its lower end, the hydraulic ram is pivotally mounted to the horizontal support member 23 by a third pivot bolt 27. This linkage allows the fork to pivot to accommodate passage over uneven terrain. To rotate the fork to its raised position, actuation of the hydraulic ram causes the pivot arm 17 to engage the stop plate 16 which rotates lever arm 15 and the cylindrical shaft 13 attached thereto.

In one embodiment of the invention, a threaded support rod 20 is provided which is connected at one end to the outward end of the angled member 28 and at the other end to the stop plate. The threaded rod may be fastened to the stop plate 16 by providing it with an aperture 21 and fastening the rod therethrough with a threaded nut. This threaded rod provides additional supporting reinforcement to the fork.

The apparatus of the invention is readily mountable and dismountable from a tractor.

To use the subject invention, the regular front-end loader of a tractor is removed and replaced by the apparatus of this invention. The bucket is slightly raised to suspend the fork, which extends approximately six inches below the bottom of the bucket 3, immediately above the ground surface. The lost-motion coupling permits the fork to pivot to accommodate surface irregularities. To remove a stone, the bottom 7 of the fork 6 is forced under the lower surface of the stone. When a stone is partially embedded, the bucket may be lowered to permit the fork to penetrate beneath the surface of the soil and flip the stone out and onto the ground surface where it can be picked up by the fork 6. Both the horizontal support member 23 and the threaded rod 20 brace the fork to prevent damage during use. When a stone has been lifted onto the bottom 7 of the fork, the hydraulic ram is activated which pivots the fork to its raised position. The back 8 and side 9 of the fork form a chute along which the stone will slide and fall into the bucket. The spaces between the tines allow soil picked up with the stone to fall back to the ground. After transfer of the stone to the bucket, the hydraulic ram 14 is released and the fork rotates back to its lowered position. When the bucket is filled, the collected stones may be dumped at an appropriate location outside the field and the clearing procedure continued.

It will be readily apparent to those skilled in the art that various embodiments of the invention may be made which do not depart from the spirit or scope of the invention. The present embodiments are therefore to be considered as illustrative and not restrictive, the scope of the invention being indicated by the claims rather than by the foregoing description, and all embodiments which come within the range of the equivalents of the claims are intended to be embraced.

We claim:

1. In combination with a front-end loader bucket having at least one longitudinally extending side wall and a support member extending laterally outwardly thereof, a dismountable stone picker comprising:

a fork member;

means rotatably mounting the fork member on said side wall of the bucket above the support member so that the fork member can pivot about an axis parallel to the side wall; and a hydraulic drive coupled between the support member and the fork member, the hydraulic drive when actuated pivoting the fork member about said axis to transfer stones from it to the bucket.

2. A stone picker as set out in claim 1 wherein the connection between the hydraulic drive and the fork member is a lost-motion connection whereby the fork member pivots so that its base accommodates surface irregularities.

3. A stone picker as set out in claim 1 wherein the fork member rests on the support member when the hydraulic drive is not actuated.

4. A stone picker as set out in claim 3 further including adjustable support means to vary the spacing of the fork member from the support member in its rest position.

* * * * *